(12) United States Patent
Lim et al.

(10) Patent No.: US 8,331,617 B2
(45) Date of Patent: Dec. 11, 2012

(54) ROBOT VISION SYSTEM AND DETECTION METHOD

(75) Inventors: Eul Gyoon Lim, Daejeon (KR); Jae Il Cho, Daejeon (KR); Dae Hwan Hwang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1071 days.

(21) Appl. No.: 12/265,365

(22) Filed: Nov. 5, 2008

(65) Prior Publication Data

US 2009/0141938 A1   Jun. 4, 2009

(30) Foreign Application Priority Data

Nov. 8, 2007  (KR) .................. 10-2007-0113682

(51) Int. Cl.
*G06K 9/00*   (2006.01)
*G06K 9/46*   (2006.01)
(52) U.S. Cl. ......... 382/103; 382/154; 382/248; 382/250
(58) Field of Classification Search .................. 382/103, 382/154, 248, 250
See application file for complete search history.

(56) References Cited

U.S. PATENT DOCUMENTS

| 7,203,356 B2* | 4/2007 | Gokturk et al. ............... 382/154 |
| 7,769,491 B2* | 8/2010 | Fukuchi et al. ............... 700/253 |
| 2003/0161400 A1* | 8/2003 | Dinerstein et al. ....... 375/240.16 |
| 2006/0013509 A1 | 1/2006 | Kee et al. |
| 2008/0037862 A1 | 2/2008 | Jeon et al. |

FOREIGN PATENT DOCUMENTS

| JP | 2001-84383 | 3/2001 |
| KR | 10-2006-0006189 | 1/2006 |
| KR | 10-0564236 | 3/2006 |
| KR | 10-0813100 | 3/2008 |

OTHER PUBLICATIONS

Grammalidis, N.; Strintzis, M.G.; , "Disparity and occlusion estimation in multiocular systems and their coding for the communication of multiview image sequences," Circuits and Systems for Video Technology, IEEE Transactions on , vol. 8, No. 3, pp. 328-344, Jun. 1998.*
Foggia et al. "A moving object and obstacle detection system in real-time AVG and AMR applications" ARAS Conf., Dec. 19-21, 2005.*
Akio Yoneyama et al., "Moving Object Detection from MPEG Video Stream", Systems and Computers In Japan, vol. 30, No. 13, 1999, pp. 1-12.
Mau-Tsuen Yang et al., "A Multimoddal Fusion System for People Detection and Tracking", 2005 Wiley Periodicals, Inc.

* cited by examiner

*Primary Examiner* — Bhavesh Mehta
*Assistant Examiner* — Utpal Shah
(74) *Attorney, Agent, or Firm* — Staas & Halsey LLP

(57) ABSTRACT

A robot vision system for outputting a disparity map includes a stereo camera for receiving left and right images and outputting a disparity map between the two images; an encoder for encoding either the left image or the right image into a motion compensation-based video bit-stream; and a decoder for extracting an encoding type of an image block, a motion vector, and a DCT coefficient from the video bit-stream. Further, the system includes a person detector for detecting and labeling person blocks in the image using the disparity map between the left image and the right image, the block encoding type, and the motion vector, and detecting a distance from the labeled person to the camera; and an obstacle detector for detecting a closer obstacle than the person using the block encoding type, the motion vector, and the DCT coefficient extracted from the video bit-stream, and the disparity map.

13 Claims, 12 Drawing Sheets

ROBOT VISION SYSTEM AND DETECTION METHOD

CROSS-REFERENCE(S) TO RELATED APPLICATIONS

The present invention claims priority of Korean Patent Application No. 10-2007-0113682, filed on Nov. 8, 2007, which is incorporated herein by reference.

FIELD OF THE INVENTION

The present invention relates to a robot vision system and a detection method, and more particularly, to a movable robot vision system that outputs an original image and a disparity map of a stereo camera and a detection method that are capable of approaching a moving person while avoiding obstacles.

This work was supported by the IT R&D program of MIC/IITA. [2005-S-033-03, Embedded Component Technology and Standardization for URC]

BACKGROUND OF THE INVENTION

As known, a conventional movable robot uses ultrasonic sensors or infrared sensors for sensing a distance to obstacles, as well as a camera for having a conversation with a person.

Several sensors of the same type, each having a highly limited sensing range, must be mounted around the robot spaced uniformly in order to sense the whole vicinity of the robot, which makes an internal configuration and functions of the robot complex.

A stereo camera system for extracting distance information from disparity maps imaged by two or more cameras mounted spaced from one another for sensing a distance from a movable robot to an obstacle without using several sensors may be mounted and used to the movable robot.

Since a horizontal viewing angle of one camera is two to three times wider than a horizontal detection angle of an ultrasonic sensor and a stereo camera is normally mounted on a pan tilt mechanism of the robot being able to be directed in any direction every moment, a movable robot using the stereo camera does not need ultrasonic sensors or infrared sensors, thus simplifying an internal configuration of the robot and facilitating maintenance of the robot.

However, most of commercially available stereo camera systems are adapted to output only a disparity map in consideration of a connection with a personal computer ("PC"), which requires a high-level module processor to perform data processing, such as filtering, segmenting, and labeling.

Meanwhile, the plurality of ultrasonic sensors or the stereo camera system used as described above provide only distance information, which does not assist in determining whether something placed in that distance is an obstacle to be avoided by the movable robot or a desired target (e.g., a person) to be served by the movable robot.

A conventional movable robot, for example, must generate a map in advance using ultrasonic sensor distance information and compare current distance information with the map to discover the person using the difference, or must perform additional computation to analyze an original image of the camera and discover a person. This process makes calculation in a high-level module processor very complex. In particular, there are calculation methods for discovering a person from an original image including a method for discovering an area similar to a person's face within an image, and a method for discovering a person based on a motion.

Among them, the method for discovering a person's face within the image includes discovering a similar area to the face and comparing a pattern of the area with that of other objects for exclusion. When a typical public library is used, even a Pentium 4 processor is insufficient to analyze an image having a 320×240 resolution ten times per second. Accordingly, the movable robot is incapable of carrying out such a calculation-intensive function even though it is equipped with an up-to-date PC.

The method for discovering person based on a motion may be classified into a method for deriving a disparity image between adjacent frames, and a method for accumulating a disparity image one reference image and a current frame image. The method for discovering person based on a motion includes deriving a difference between images imaged by one stationary camera at different points of time. An indoor movable robot using this motion-based method is adequately practical because an indoor moving object is something like a person or a pet animal. However, a disparity image derived from an original image taken by the camera on a pixel basis is affected by a noise in the image, which requires an additional calculation process and in turn, consumes many resources of a high-level module processor, which may be used for other tasks of the movable robot.

Meanwhile, a vision-based navigation for recognizing obstacles and paths based on images has been studied, in addition to image-based person recognition. However, the vision-based navigation also consumes many resources of a high-level module processor when obtaining a scale invariant feature in a pixel data area.

As described above, processing an image in the movable robot consumes many resources, such as resources of the high-level module processor (e.g., a CPU of a main controller) and power. Accordingly, a concept of a network-based robot has been recently introduced. Complex image processing calculation is performed by a networked high-performance remote server, and a movable robot only sends images via a wireless network and receives only the results.

The network-based movable robot must send images via a network. A typical robot image analysis necessitates a color image having a resolution of horizontal 320 pixels×vertical 240 pixels or more, user motion recognition necessitates a frame rate of 15 frames or more per second, and image-based navigation necessitates a higher frame rate, increasing a transfer amount of image data.

However, it is virtually impossible for the movable robot to send original large data as it is because the movable robot must use a less reliable wireless network than a wired network. In order to perform a high-level image recognition function, the network-based movable robot compresses image data and transmits the compressed image data, and a remote server decompresses the compressed image data and, thereby, restores and processes the image. Here, the image compression uses a video format in which a difference with a previous frame is coded in a block unit of 16×16 pixels or 8×8 pixels, such as MPEG4, H.263, or H.264. A video hardware encoder may be a typical video encoder chip or hardware logic embedded in a processor.

SUMMARY OF THE INVENTION

In the conventional background technology described above, the network-based movable robot uses the video encoder only to compress image data. However, a video encoder necessarily used for the network-based movable robot generates some information in the encoding process.

That is, in encoding a difference between a previous frame and a current frame, when the video object moves within a screen, video encoders process the pixel data as motion of a macro block that is a group of predetermined pixels instead of storing the pixel data as it is. Accordingly, motion information, i.e., a motion vector is newly generated in the video encoding process. An influence from a local minor change or a noise that cannot be perfectly processed as a motion of macro block is converted and compressed in a Discrete Cosine Transform (DCT) coefficient form. Since the noise influence is separated from the motion vector, the motion vector information may be considered as disparity image data less affected by the noise compared to general disparity image data on a pixel-by-pixel basis.

Motion detection with video hardware encoder or motion vector calculation using software is performed in the field of monitoring cameras for crossroads or security cameras. However, because such cameras are fixed and operate under an assumption that a background is not greatly changed within a short time, conventional techniques cannot be applied to movable robot applications in which a view is continuously changed whenever a movable robot moves or interacts with a person.

A technology of detecting a motion using a motion vector of a video is widely used for enhancing the performance of the video encoder itself. Because the technology is used for dividing a foreground and a background more accurately and, thereby, reducing data, it cannot be directly applied to movable robot applications in which a view is continuously changed whenever a movable robot moves or interacts with a person. In particular, distance measurement and obstacle detection essential in the movable robot are not considered at all.

Therefore, the present invention provides a robot vision system and a detection method in which the system outputs an original image of the stereo camera (left and right cameras) and a disparity map, and a movable robot detects a location of a person and approaches a moving person while avoiding obstacles.

In accordance with a first aspect of the present invention, there is provided a robot vision system for outputting a disparity map, the system including: a stereo camera for receiving left and right images and outputting a disparity map between the two images; an encoder for encoding either the left image or the right image into a motion compensation-based video bit-stream; a decoder for extracting an encoding type of an image block, a motion vector, and a Discrete Cosine Transform (DCT) coefficient from the video bit-stream; a person detector for detecting and labeling person blocks in the image using the disparity map between the left image and the right image, the block encoding type, and the motion vector, and detecting a distance from the labeled person to the camera; an obstacle detector for detecting a closer obstacle than the person using the block encoding type, the motion vector, and the DCT coefficient extracted from the video bit-stream, and the disparity map.

In accordance with a second aspect of the present invention, there is provided a detection method in a robot vision system, including: reconfiguring left and right images; receiving the reconfigured image and encoding the same into a motion compensation-based video bit-stream; partially decoding the video bit-stream to extract an encoding type of an image block, a motion vector, and a DCT coefficient from the video bit-stream; detecting and labeling person blocks in the image using a disparity map between the left image and the right image, the block encoding type, and the motion vector, and detecting a distance from the labeled person to the camera; and detecting a closer obstacle than the person using the block encoding type, the motion vector, and the DCT coefficient extracted from the video bit-stream, and the disparity map.

In accordance with a third aspect of the present invention, there is provided a detection method in a robot vision system, including: photographing left and right images and calculating a disparity map between left and right images using the two images; reconfiguring one of the left and right images into an image having a resolution for encoding; receiving the reconfigured image and encoding the same into a video bit-stream; decoding to extract an encoding type, a motion vector, and a DCT coefficient of the image from the video bit-stream; detecting and labeling blocks of a moving person within the image using the disparity map between the left image and the right image, and the motion vector, and detecting a distance from the labeled person to the camera; and detecting a closer obstacle than the person using the extracted encoding type, motion vector, and DCT coefficient of the image, and the disparity map between the left image and the right image.

In the movable robot vision system that outputs an original images and a disparity map of the stereo camera according to the present invention, the movable robot vision system can discover a person who waves his or her hand or moves in front of the robot in order to attract a robot's attention and determine an obstacle in front of the person only with relatively low computational complexity, thereby less consuming a main processor and a battery and increasing an idle time of the movable robot.

In the movable robot vision system that outputs an original images and a disparity map of the stereo camera according to the present invention, the movable robot can simply detect a location of a person and approach a moving person while avoiding obstacles. Accordingly, a networked movable robot system does not have to send an image to a server all through the idle time, thus reducing network traffic and increasing the availability of the server.

In the movable robot vision system that outputs an original images and a disparity map of the stereo camera according to the present invention, even when a robot server is unavailable due to temporarily excessive traffic or due to network disconnection caused by the robot passing through a dead spot while tracking a person, the robot terminal itself can continue to track a person and move to a network available region, thus continuously providing service.

BRIEF DESCRIPTION OF THE DRAWINGS

The objects and features of the present invention will become apparent from the following description of preferred embodiments given in conjunction with the accompanying drawings, in which.

DETAILED DESCRIPTION OF THE EMBODIMENTS

Hereinafter, preferred embodiments of the present invention will be described in detail with reference to the accompanying drawings so that they can be readily implemented by those skilled in the art.

Figure 1:
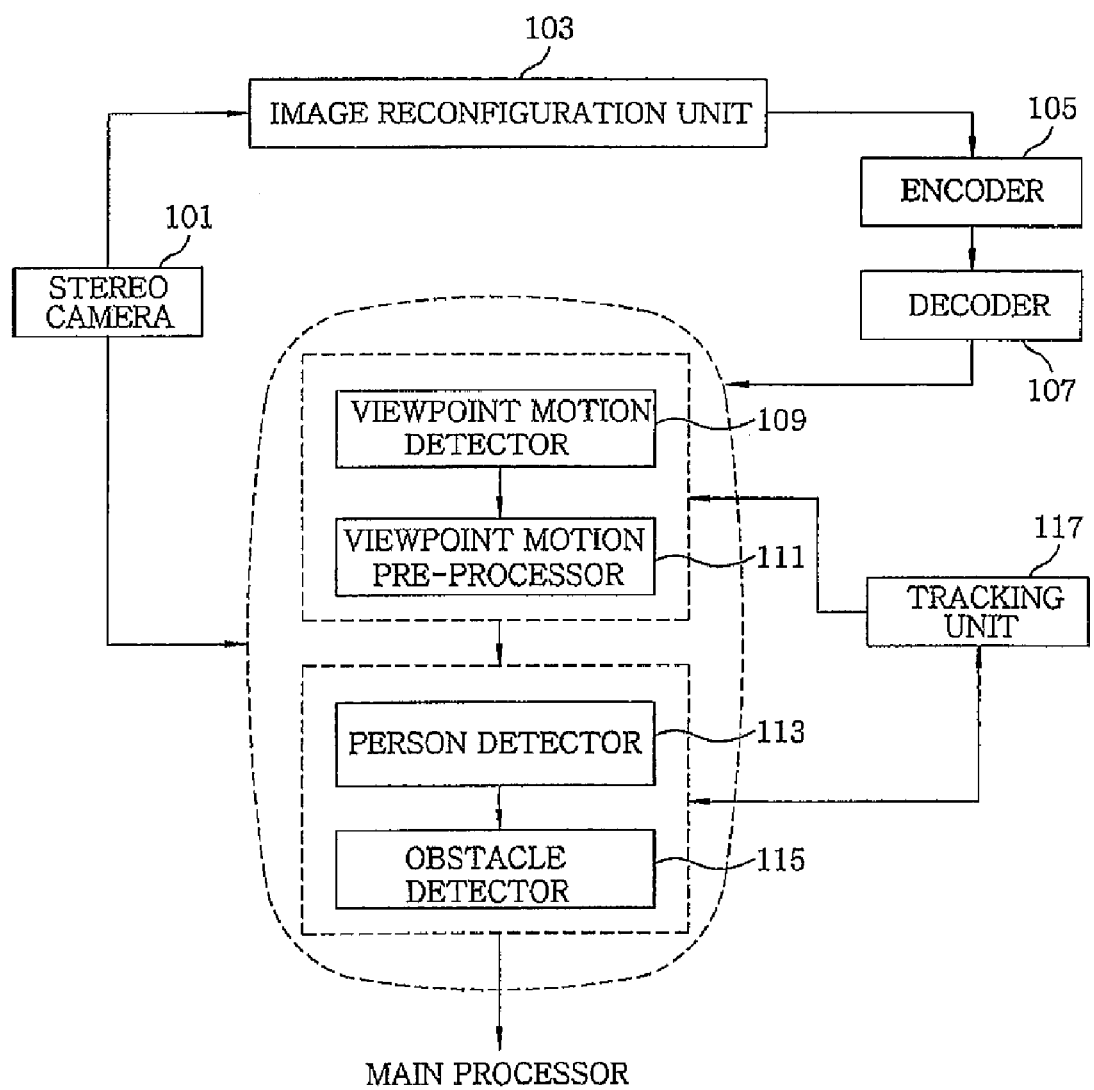
FIG. 1 is a block diagram illustrating a robot vision system for detecting a person and obstacles during a motion in accordance with a preferred embodiment of the present invention.

FIG. 1 is a block diagram illustrating a robot vision system for detecting a person and obstacles during a motion in accordance with a preferred embodiment of the present invention. The robot vision system includes a stereo camera 101, an image reconfiguration unit 103, an encoder 105, a decoder 107, a viewpoint motion detector 109, a viewpoint motion pre-processor 111, a person detector 113, and an obstacle detector 115.

The stereo camera 101 photographs a left view image of the robot using a left camera and a right view image of the robot using a right camera, calculates a disparity map (e.g., a disparity image between the left and right images), which is related to a difference between the two images, provides the left view image and the right view image to the image reconfiguration unit 103, and provides the calculated disparity map to the person detector 113 and the obstacle detector 115.

The image reconfiguration unit 103 magnifies or reduces and arranges the left view image and the right view image input from the stereo camera 101 in any magnification, reconfigures the same to have a resolution and a format for encoding into a video, and provides the resultant image to the encoder 105.

The encoder 105 receives the image on a frame-by-frame basis from the image reconfiguration unit 103, encodes the image into a video bit-stream based on a motion compensation technology such as an encoding unit, and provides the bit-stream to the decoder 107.

Some information generated in the video encoding process may be used by the movable robot. That is, in the case of low-speed panning in which the stereo camera 101 is panned to the left when the movable robot is stationary, most blocks having sufficient patterns move from the left of the current block and become P blocks and the motion vector is directed to the left. The rightmost blocks are generally encoded into P blocks, but the leftmost blocks cannot be motion-compensated because of a new included image. Some video encoder units provide an Unrestricted Motion Vector (UMV) function capable of indicating the outside of the image. Use of this function allows the leftmost block to be encoded into a P block. When this function is set to be not activated, leftmost blocks are encoded into I blocks (or intra mode blocks) having no motion vector. On the other hand, in the case of low-speed panning in which the stereo camera 101 is panned to the right, rightmost blocks are encoded into I blocks and leftmost blocks are encoded into P blocks having a motion vector directed to the right.

More specifically, when a 320×240 image is encoded by MPEG4 using the stereo camera 101 having an angle of view of 60°, there are 40 horizontal 8×8 blocks and a horizontal viewing angle of one block is 1.5°(=60 (horizontal viewing angle of the camera)/40 (horizontal resolution/8)). That is, when a frame number per second is N, the robot vision system is available at a rotation speed (of horizontal viewing angle of block*N° or less per second). When the horizontal resolution of an input image is proportionally reduced to 1/M, a rotation speed is applicable (up to horizontal viewing angle of the block*N*M° per second). Accordingly, in the case of real-time 320×240 resolution of 30 frames per second, the robot vision system is available even when it pans at a horizontal direction speed of 45° per second.

Here, the encoder 105 may be an internal hardware block of one chip or an embedded processor and, thereby, scarcely consumes the main processor (CPU). A typical encoder may have a UMV function. However, the present invention does not use the UMV function even though an amount of data increases.

The encoder may also have a global motion vector option that may represent an entire change of the image according to panning and zoom of the camera. However, in a typical encoder, the global motion vector function is effectively used only to compress image data effectively. Accordingly, the vector value may not indicate an actual camera operation. Therefore, the present invention does not use the global motion vector function.

The decoder 107 receives a video bit-stream corresponding to one frame from the encoder 105, extracts only an encoding type of each image block, a motion vector, and a Discrete Cosine Transform (DCT) coefficient from the video bit-stream, and provides them to the viewpoint motion detector 109, the person detector 113, and the obstacle detector 115. Here, when the encoding unit is, for example, MPEG4 or H.263, an Inverse Discrete Cosine Transform (IDCT) process may be omitted.

The viewpoint motion detector 109 detects a change in the origin and direction of the camera caused by a motion of the movable robot or camera pan tilt. The viewpoint motion detector 109 can recognize the panning direction of the stereo camera 101 from the type of macro blocks at both left and right ends of the image and the direction of the motion vector obtained by the encoding type of each image block, the motion vector, and the DCT coefficient from the decoder 107, recognize a tilt direction of the stereo camera 101 from the type of blocks at the upper and lower ends and the direction of the motion vector, detects a change in the motion vector corresponding to a change in the origin and the direction of the camera using the panning direction and tilt direction, and provides the detected change to the viewpoint motion pre-processor 111. Here, the viewpoint motion detector 109 may detect the change in the motion vector corresponding to the change in the origin and the direction of the camera using motion information and camera pan tilt information of the robot input through a variation of the origin and the viewpoint of the camera between a previous image and a current image from the main processor in the movable robot, and provide the same to the viewpoint motion pre-processor 111.

The viewpoint motion pre-processor 111 analyzes a change in the motion vector corresponding to the change in the origin and direction of the camera detected and input by the viewpoint motion detector 109. When it is determined from the change that the viewpoint of the camera rotates, the viewpoint motion pre-processor 111 performs viewpoint motion amount-based correction by averaging motion vectors in a direction determined by the type of both boundary blocks and subtracting an average value from motion vectors of all the blocks, and provides the result to the person detector 113. In the process of averaging the motion vectors, the motion vector of the person recorded in the tracking unit 117 is excluded.

The person detector 113 uses the decoding result of a video portion of the disparity map and the original image input from the stereo camera 101. When the disparity map is not fitted to the left camera image or the right camera image, the person detector 113 corrects the disparity map to be fitted to any one of the camera images. The person detector 113 forms a binary image by setting blocks having a motion vector among the decoding result input from the decoder 107 to '1' and setting blocks having no motion vector to '0', and fills empty internal blocks by sequentially applying dilation and erosion to the binary image. This is because creation of the motion vector requires sufficient complex patterns; and, therefore, the motion vector is primarily created on a boundary between the person and the background and not created in the inside. After filling the blocks, the person detector 113 performs additional erosion on the binary image to remove isolated random vector blocks, labels non-adjacent blocks, obtains a representative value of disparity map blocks corresponding to the labeled blocks, converts the representative value into distance information, stores a distance of each label block, regards the labeled block as the person, and provides the person detection result to the main processor via the obstacle detector 115. Here, when 4MV (motion vector) MPEG4 encoding is performed on the original image having a resolution of 320×240, the resolution of the binary image formed by the above-described process is 40×30. Accordingly, binary morphology computational complexity for detecting a person is not very high.

The obstacle detector 115 forms a gray image by setting blocks having a motion vector, blocks determined to be a moving body, blocks included in the moving body in the dilation and erosion process among the decoding result input from the decoder 107 to '1' indicating a person and setting other blocks to '0'. Then, the obstacle detector 115 forms a binary image by changing a pixel having a current value of '0' into '2' if the block has a smaller binocular disparity value than that of the person, and into '3' if the block has a greater binocular disparity value than that of the person, and thereby designates a pixel having a value of '3' as a foreground and a pixel having a value of '0', '1' and '2' as a background. If erosion and dilation is applied to isolate using pixels having binocular disparity value of '3', labels the result obtained by applying, regards labeled blocks occupied by a closer obstacle than the person, as the obstacle, and provides the obstacle detection result to the main processor.

Because the person detector 113 detects the person based on the motion vector and the obstacle detector 115 discovers obstacles based on the distance of the detected person, the tracking unit 117 resolves an issue of the obstacle detector not operating when the person is stationary. The tracking unit 117 finally conserves the motion vector, the binary image, and the distance information for the detected person, and instead outputs previously stored person information to the obstacle detector when the person motion is no longer detected, so that the obstacle detector continues to detect the obstacle, and provides the motion vector information to the viewpoint motion pre-processor 111.

Thus, in the movable robot vision system that outputs the original image and the disparity map of the stereo camera (including the left and right cameras) in accordance with the present invention, the movable robot vision system can detect a location of a person and approach the moving person while avoiding obstacles, to discover the person who waves his or her hand or moves in front of the robot in order to attract a robot's attention, in a manner that is robust against an image noise and requires only a relatively low computational complexity, thereby less consuming a main processor and a battery and increasing an idle time of the movable robot.

Figure 2:
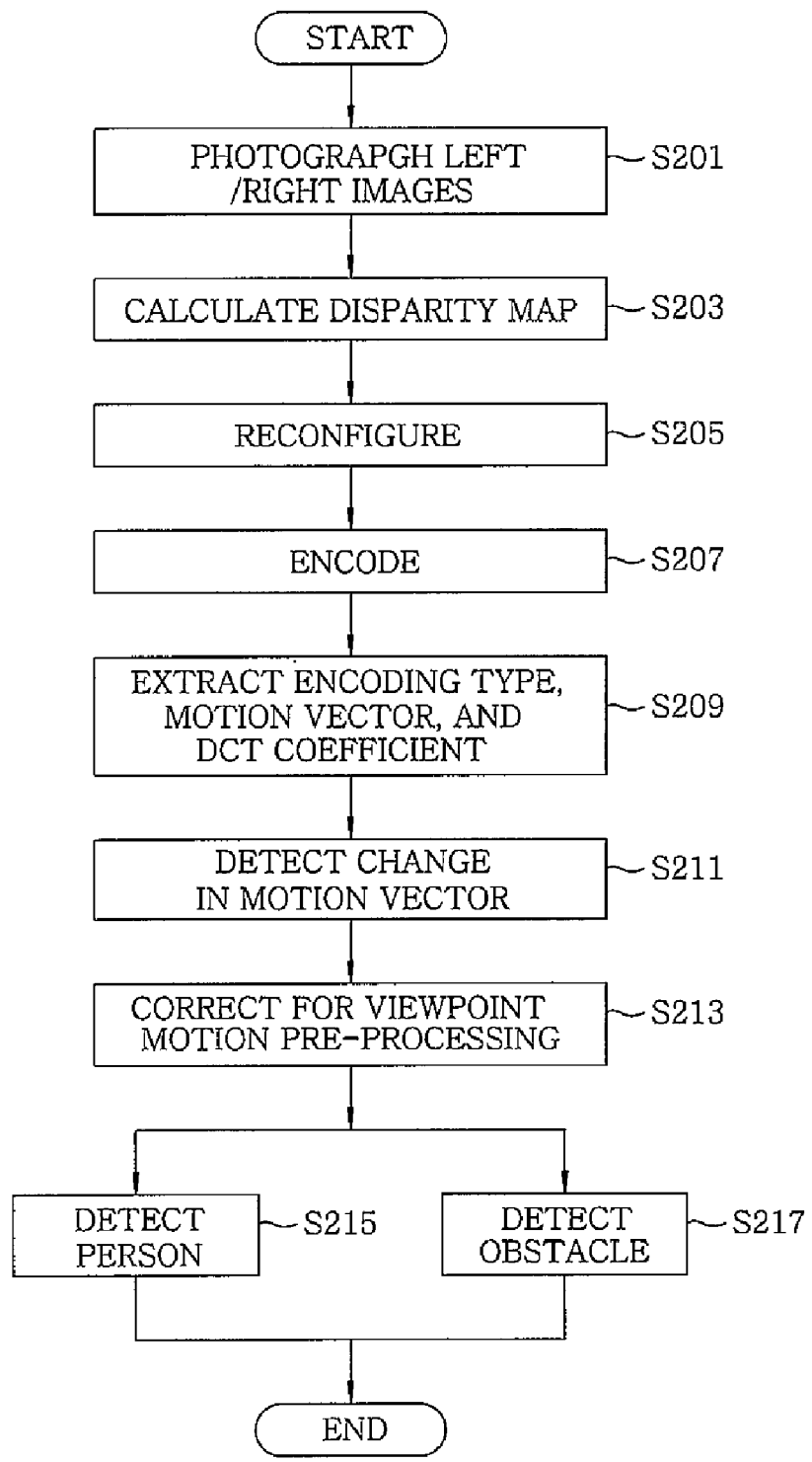
FIG. 2 is a flowchart illustrating a method for detecting a person and obstacles in a robot vision system during a motion in accordance with a preferred embodiment of the present invention.

FIG. 2 is a flowchart illustrating a method for detecting a person and obstacles in a robot vision system during a motion in accordance with a preferred embodiment of the present invention.

First, a left view image and a right view image of a robot are photographed using a stereo camera 101 mounted at the left and right of the movable robot (S201), and a disparity map, i.e., a difference between the two imaged image is calculated (S203). Here, the two images and the disparity map may have one of the resolutions supported by an MPEG4 format, e.g., 320×240.

The stereo camera 101 then provides the left and right view images to the image reconfiguration unit 103 and the calculated disparity map to the person detector 113 and the obstacle detector 115.

The image reconfiguration unit 103 magnifies or reduces and arranges the left view image and the right view image input from the stereo camera 101 in any magnification, reconfigures the images to have a resolution and a format for video encoding (S205), and provides the image to the encoder 105.

The encoder 105 receives the image on a frame-by-frame basis from the image reconfiguration unit 103 and sets four motion vectors per macro block. Here, B picture is not used. UMV, which is an option of MPEG4, is not used in order to apply the viewpoint motion detector 109. Since the macro block has a resolution of 20×15, the mode is set to use four motion vectors per macro block in order to use 40×30 motion vector arrays and binary images (S207). In order to do so as described above, the image reconfiguration unit 103 encodes binary images into a video bit-stream based on a motion compensation technology such as an encoding technology (which is one of MPEG4, MPEG2, H.264, and H263; MPEG4 herein), and provides the video bit-stream to the decoder 107.

The decoder 107 receives a video bit-stream corresponding to one frame from the encoder 105, extracts only an encoding type of each image block, a motion vector, and a DCT coefficient from the video (S209), and provides the same to the viewpoint motion detector 109, the person detector 113, and the obstacle detector 115.

The viewpoint motion detector 109 may recognize a panning direction of the stereo camera 101 from the type of macro blocks at both left and right ends of the image and a direction of the motion vector obtained from the encoding type of each image block, the motion vector, and the DCT coefficient input from the decoder 107, recognize a tilt direction of the stereo camera 101 from the type of blocks at upper and lower ends and a direction of the motion vector, detects a change in the motion vector corresponding to the change in the origin and direction of the camera using the panning direction and the tilt direction (S211), and provides the change information to the viewpoint motion pre-processor 111.

Figure 9:
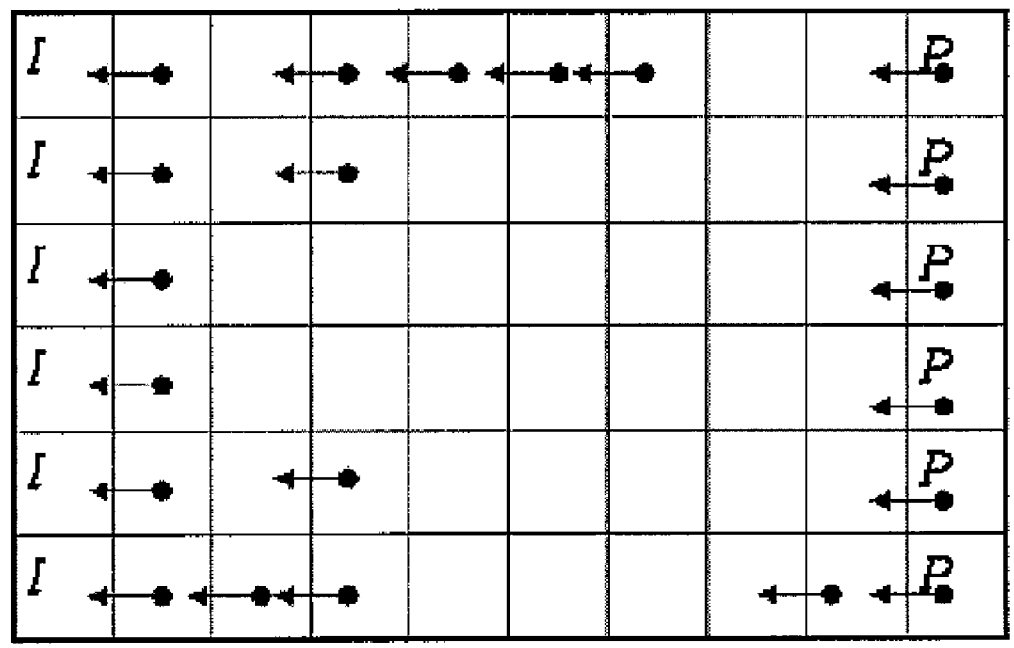
FIG. 9 illustrates an encoding mode of left and right boundary blocks and a motion vector of a background block in accordance with the present invention.

More specifically, the viewpoint motion detector 109 receives the block mode, the motion vector array, and the result of the tracking unit 117, counts the number of I blocks and P blocks (or, inter mode blocks) in left edge blocks of the image, and counts the number of I blocks and P blocks (or, inter mode blocks) in right edge blocks of the image. In counting, the viewpoint motion detector 109 divides horizontal components of motion vectors of remaining blocks excluding a person area detected by the tracking unit 117 into left, right, and 0. The viewpoint motion detector 109 determines a panning direction of the camera using the number of the edge I blocks, the number of the edge P blocks, the number of the motion vectors directed to the left, and the number of the motion vectors directed to the right. For example, when I blocks appear at the left edge, P blocks appear at the right edge, and motion vectors are directed to the left as shown in FIG. 9, the viewpoint motion detector 109 determines that the view of the robot has moved to the left. Also, the viewpoint motion detector 109 may determine the tilt direction of the camera by applying the same method to upper and lower edges, and average motion vectors excluding a motion vector of the person area of the tracking unit among the motion vectors in the pan tilt direction to estimate a change in the pan tilt.

The viewpoint motion pre-processor 111 analyzes the change in the motion vector corresponding to the change in the origin and direction of the camera detected and input by the viewpoint motion detector 109. When it is determined from the change that the camera rotates, the viewpoint motion pre-processor 111 performs viewpoint motion amount-based correction by averaging motion vectors in a direction determined by the type of both boundary blocks and subtracting an average value from motion vectors of all the blocks (S213), and provides the result to the person detector 113. In the process of averaging the motion vectors, the motion vector of the person recorded in the tracking unit 117 is excluded and the tracking result input from the tracking unit 117 is included.

The person detector 113 uses the decoding result of a video portion of the disparity map and the original image input from the stereo camera 101. When the disparity map is not fitted to left camera image or the right camera image, the person detector 113 corrects the disparity map to be fit to any one camera image. The person detector 113 forms a binary image by setting blocks having a motion vector among the decoding result input from the decoder 107 to '1' (foreground value) and setting blocks having no motion vector to '0' (background value).

Subsequently, the person detector 113 sequentially applies dilation and erosion to the binary image to fill empty internal blocks surrounded by a foreground value '1' with the foreground value '1', and then performs additional erosion on the binary image to remove random vector blocks (with foreground value '1') surrounded and isolated by a background value '0', and sets the value as the background value '0'. The person detector 113 performs labeling to group adjacent blocks into one object, obtains a representative value of disparity map blocks at a location corresponding to the labeled object, converts the representative value into distance information, and stores the distance information as a distance of each object. This labeled object is a moving body, which may be an entire or partial body of a moving person, a pet animal, or a car. The distance information of the object, the camera viewing angle, and horizontal and vertical values of the object may be used to calculate an actual size of the object in the image.

Accordingly, a larger object than a typical person may be excluded from a person candidate. A smaller object than the typical person may be a pet animal or a partial portion of the person, such as his or her arm and face. When segmentation is performed beginning with a disparity map location corresponding to the object, an entire region, including a stationary portion, can be found. Accordingly, it is possible to determine whether the object is part of the person or a pet animal. However, an object moving in home or office can usually be regarded as a person. In particular, since a user may wave his or her hand to attract a robot's attention, the moving object may be assumed to be the person. Accordingly, the labeled moving body (object) is regarded as a person, and the person detection results are provided to the main processor via the obstacle detector 115 (S215).

The obstacle detector 115 creates a gray image by setting blocks having a motion vectors, blocks included in the moving body, and blocks included in the moving body in the dilation and erosion process among the decoding result input from the decoder 107 to '1' indicating a person and setting others to '0'.

The obstacle detector 115 then forms a binary image by changing blocks having a smaller binocular disparity value than a person that is moving body (farther blocks than the person) in a pixel having a current value of '0' into '2', changing blocks having a greater binocular disparity value than the person (closer blocks than the person) into '3', setting pixels having a binocular disparity value of '3' as a foreground, and setting 0, 1, and 2 as a background. The obstacle detector 115 removes isolated blocks by applying erosion and dilation and labels the result and, then, stationary objects closer than the moving person are detected as objects. The obstacle detector 115 regards these objects as obstacles and provides area and distance information of the obstacles to the main processor (S217).

Thus, in the movable robot vision system that outputs an original images and a disparity map of the stereo camera in accordance with the present invention, the movable robot can directly detect a direction of a person and approach the person while avoiding obstacles, thereby eliminating a need for transmission of an image to a server all through an idle time. In case of network-based robots, this can reduce network traffic and increase the availability of the server.

Figure 3:
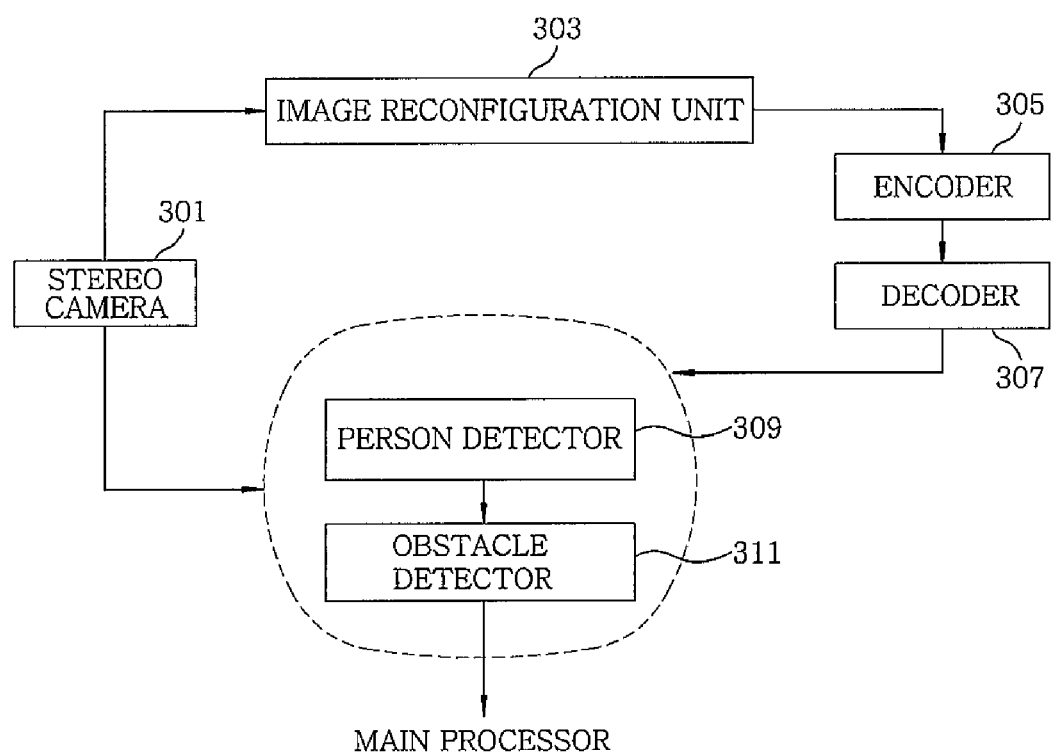
FIG. 3 is a block diagram illustrating a robot vision system for detecting a person and an obstacle when a view is stationary in accordance with another preferred embodiment of the present invention.

FIG. 3 is a block diagram illustrating a robot vision system for detecting a person and obstacles when a view is stationary in accordance with another preferred embodiment of the present invention. The robot vision system includes a stereo camera 301, an image reconfiguration unit 303, an encoder 305, a decoder 307, a person detector 309, and an obstacle detector 311.

The stereo camera 301 photographs a left view image of the robot using a left camera and a right view image of the robot using a right camera, calculates a disparity map, i.e., a difference between the two images, provides the left view image and the right view image to the image reconfiguration unit 303, and provides the calculated disparity map to the person detector 309 and the obstacle detector 311.

The image reconfiguration unit 303 magnifies or reduces and arranges one of view images input from the stereo camera 301 in any magnification, reconfigures the same to have a resolution and a format for encoding into a video, and provides the resultant image to the encoder 305.

The encoder 305 receives the image on a frame-by-frame basis from the image reconfiguration unit 303, encodes the image into a video bit-stream based on a motion compensated video coding technology such as MPEG4, MPEG2, H.264, and H263, and provides the bit-stream to the decoder 307.

Here, the encoder 305 encodes a first image into an I picture (I vop) and subsequent frames into a P picture (P vop).

The decoder 307 receives a video bit-stream corresponding to one frame from the encoder 305, and then prepares a block mode storage array. When a video format having no 4MV motion vector or a 4MV is not used to reduce the use of a memory, there is one block per macro block and accordingly the array size is equal to the number of macro blocks. The decoder 307 also prepares a motion vector array having the same size, records an indication whether the mode of each macro block is a P block or an I block, in the block mode storage array, and records motion vectors in the motion vector array corresponding to the P block. The decoder 307 forms a block binary image having the same size as the motion vector array, and provides the block binary image to the person detector 309 and the obstacle detector 311.

The person detector 309 regards a block having the motion vector size of nonzero as a block including a person. When the person is moving and when his or her cloths have no pattern and blocks are not discriminated, motion vectors may be primarily generated on a boundary of the body of the person but not in the inside of the person. For this reason, the person detector regards that blocks having no motion vector must be included.

When there is no proper pattern in one block corresponding to the background or there is a similar pattern around the block with the pattern, the person detector 309 excludes the block because the block leads to a motion vector even though an object is actually stationary. A newly appearing background due to motion of one block must be usually encoded into I blocks. However, when the block has a similar pattern to an adjacent block of a previous frame, the block is encoded into P blocks as well, leading to motion vectors. The motion vectors are generally not associated with a motion vector of an adjacent block and a motion vector of an adjacent block of a previous frame. Accordingly, the person detector 309 regards the direction and the size of the motion vector as random.

The person detector 309 complements a motion vector that should have appeared in the vicinity of correct motion vector macro blocks, and forms a binary image and applies a binary morphology to remove random vector macro blocks. For a macro block having a value of the macro block mode storage array being a P block and a vector size of the motion vector array being greater than 0, the person detector 309 sets a corresponding pixel value of the macro block binary image to a foreground value 1 and regards remaining pixels as a background value 0.

The person detector 309 sequentially applies foreground-value dilation and erosion to the macro block binary image and sets pixels corresponding to the omitted macro block to a foreground value 1. In this process, since I block mode macro blocks may be changed into 1, a pixel value corresponding to the I blocks is returned to 0. The inside of the moving person is filled through this process.

When the distance to the person is calculated using disparity map blocks corresponding to boundary blocks as the motion vector is primarily generated on a boundary between the person and the background, the boundary blocks must be excluded in consideration of influence from the distance to the background. Therefore, the blocks including the boundary are removed by performing additional erosion on the binary image. In this process, some of the random vectors disappear.

The person detector 309 labels the binary image to group adjacent pixels into one object, causes left and right boundaries of pixels included in each object to correspond to an angle of view of the camera to obtain an azimuth angle of the object, statistically processes binocular disparity values corresponding to pixels included in each object, regards it as a distance to the moving object, i.e., the person, and provides the person detection result to the obstacle detector 311.

The obstacle detector 311 regards the shortest distance of the distances to the person detected by the person detector 309 as a threshold of an obstacle detection distance, first excludes blocks having a motion vector and blocks determined to be the person among all the blocks, further excludes blocks included in the dilation process of the person detector 309, further excludes blocks having a greater distance obtained from the binocular disparity representative value than the threshold among the remaining blocks, forms a binary image corresponding to the remaining blocks, and fills intermediate blocks through dilation and erosion.

The obstacle detector 311 excludes excluded blocks in the person detector 309, labels remaining images to group adjacent pixels into one object, statistically processes binocular disparities corresponding to the pixels to obtain a distance to an obstacle, causes left and right pixels of the object to correspond to the angle of view of the camera, regards it as an azimuth angle of the obstacle, and provides the obstacle detection result to the main processor.

Thus, in the movable robot vision system that outputs an original images and a disparity map of the stereo camera in accordance with the present invention, the movable robot detects a location of a person and approaches a moving person while avoiding obstacles. Accordingly, even when the robot server is unavailable due to temporarily excessive traffic or due to network disconnection caused by the robot passing through a dead spot while tracking a person, the robot terminal itself can continue to track the person and move to a network available region, thus continuously providing service.

Figure 4:
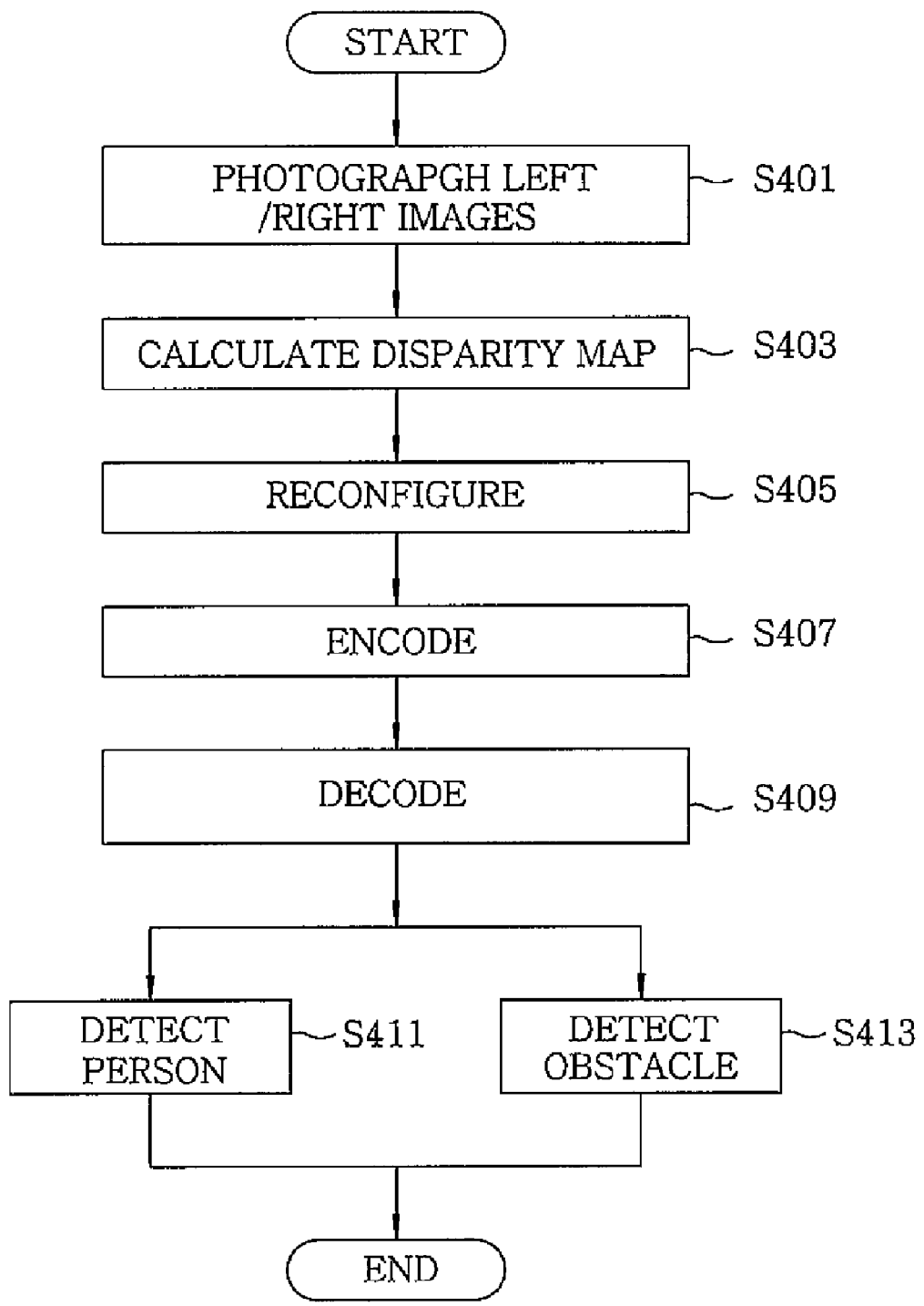
FIG. 4 is a flowchart illustrating a method for detecting a person and obstacles when a view is stationary in a robot vision system in accordance with another preferred embodiment of the present invention.

FIG. 4 is a flowchart illustrating a method for detecting a person and obstacles when a view is stationary in a robot vision system in accordance with another preferred embodiment of the present invention.

First, a left view image and a right view image of a movable robot are photographed using the stereo camera 301 mounted at the left and right of the movable robot (S401), and a disparity map is calculated, i.e., a difference between the two images (e.g., having an H263 encoding resolution of 352× 288) (S403).

Figure 12:
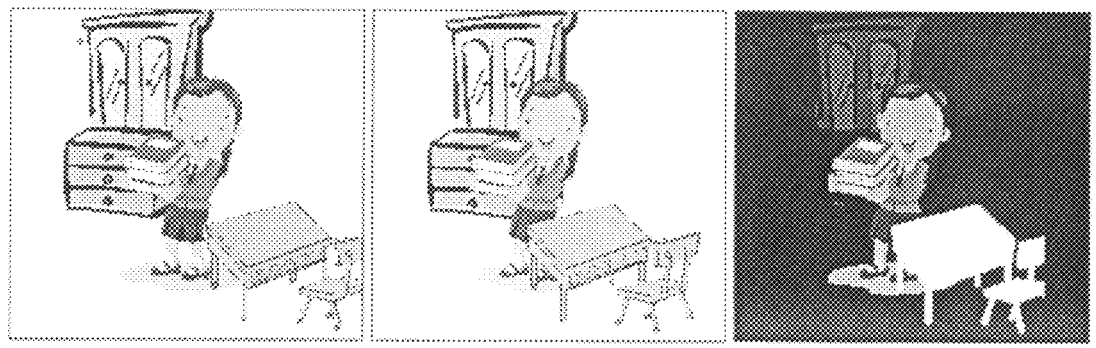
FIG. 12 illustrates left/right view images and a disparity map output from a stereo camera in accordance with the present invention.

The stereo camera 301 provides the left view image and the right view image as shown in FIG. 12 to the image reconfiguration unit 303, and provides the calculated disparity map to the person detector 313 and the obstacle detector 315.

Figure 5:
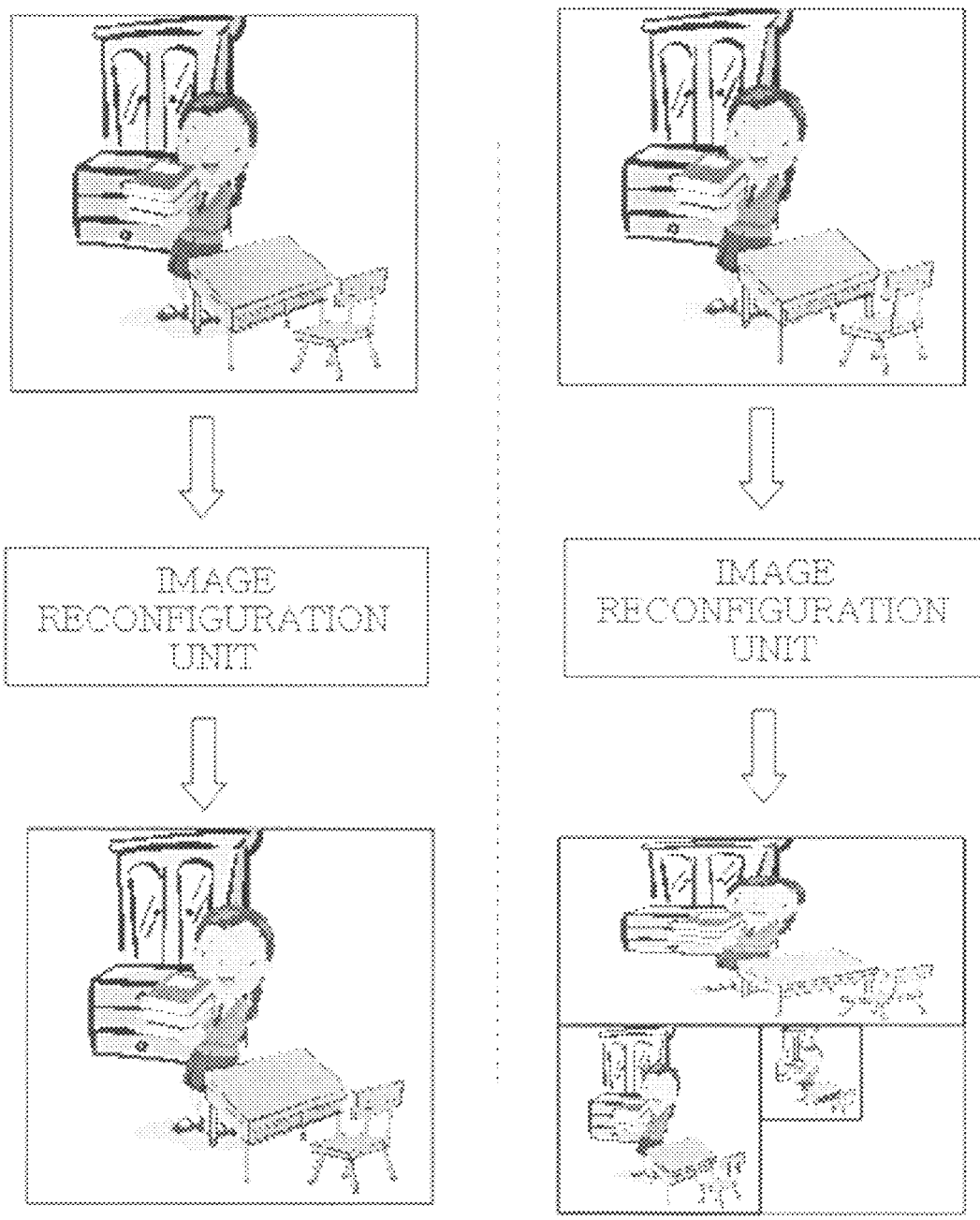
FIG. 5 illustrates operation for reconfiguring an image in accordance with the present invention.

The image reconfiguration unit 303 magnifies or reduces and arranges only the left view image shown in the left of FIG. 5 among the images from the stereo camera 301 in any magnification, reconfigures the same to have a resolution and a format for encoding into a video, and provides the resultant image to the encoder 305.

The encoder 305 receives the image on a frame-by-frame basis from the image reconfiguration unit 303, encodes the image into a video bit-stream based on a motion compensated video coding technology such as MPEG4, MPEG2, H.264, and H263 (H263 herein), and provides the bit-stream to the decoder 307.

Here, the encoder 305 encodes a first image into an I picture (I vop) and subsequent frames into a P picture (P vop).

Figure 10:
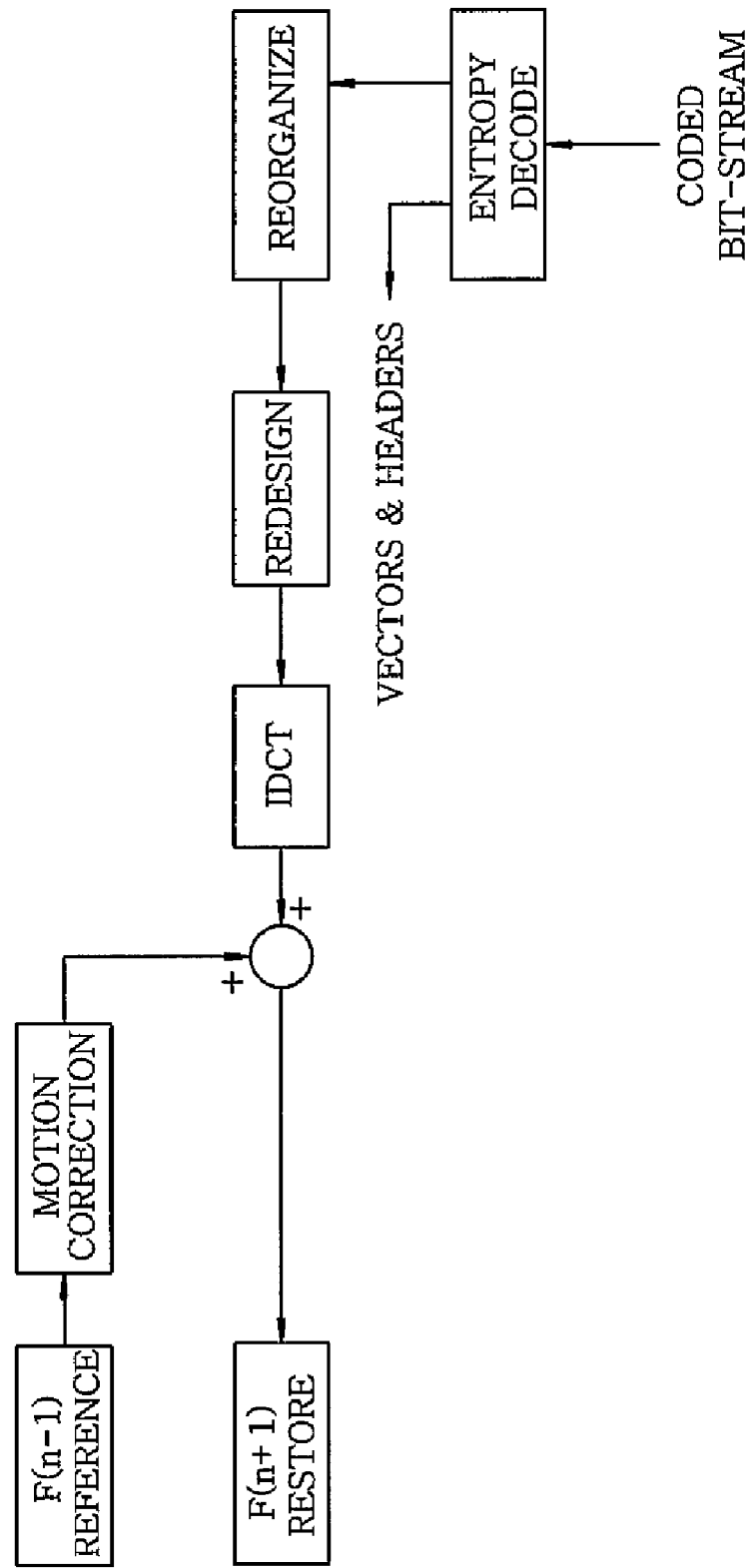
FIG. 10 illustrates a structure of a typical video decoder.
Figure 11:
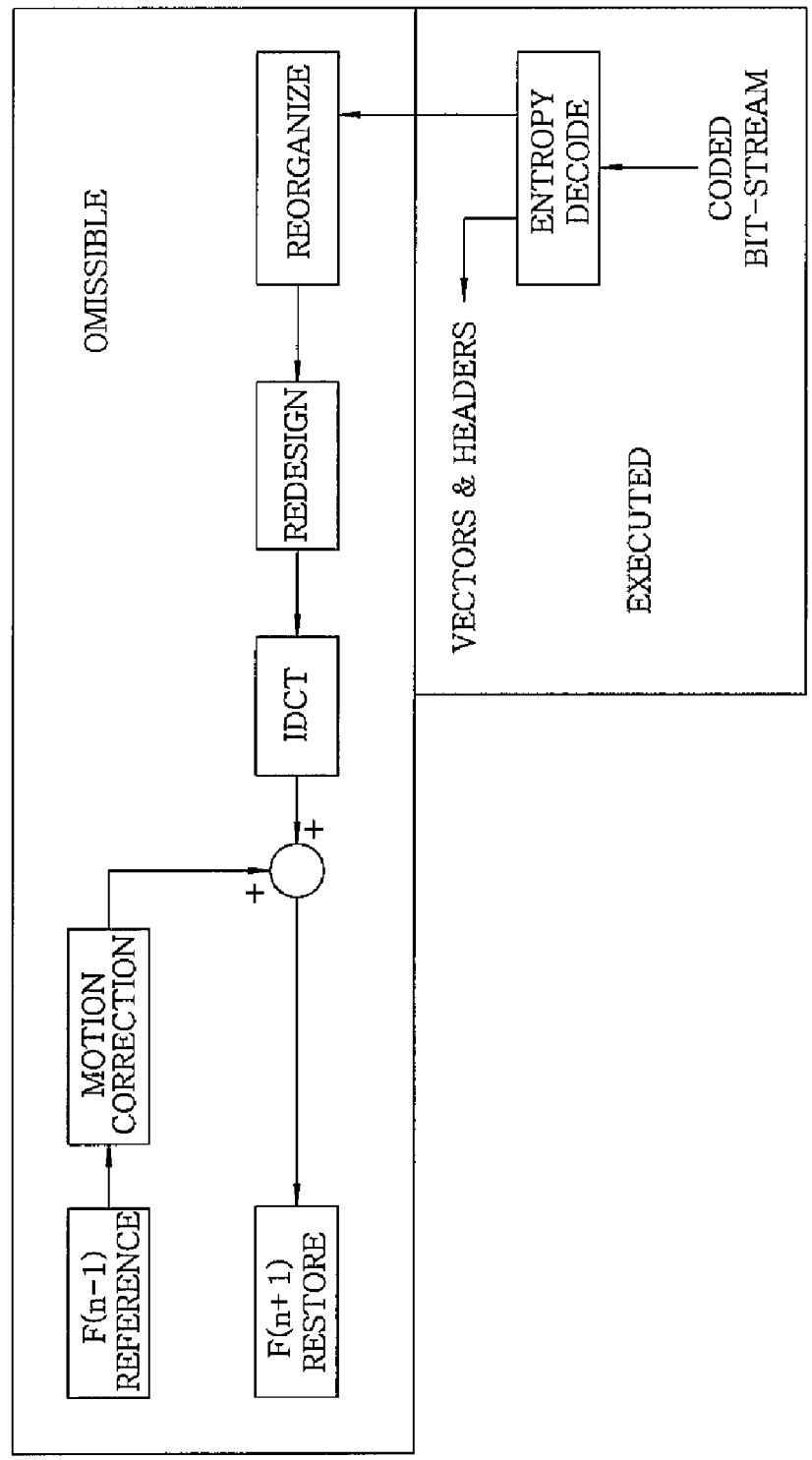
FIG. 11 illustrates functional blocks to be omitted and functional blocks to be carried out in a video decoder in order to extract only a motion vector and block mode information in accordance with the present invention.

When the decoder 307 receives and decodes the video bit-stream corresponding to one frame from the encoder 305, the decoder 307 skips inverse DCT and subsequent steps as in FIG. 11, unlike a typical decoding process shown in FIG. 10.

That is, the decoder 307 performs decoding without performing inverse DCT, motion compensation, and image restoring that occupy most of a decoding time in order to prevent a burden on a processor (S409). The decoder 307 prepares the macro block mode storage array corresponding to the number of the macro blocks (e.g., 22×18 macro blocks having a 16×16 pixel size since the resolution is 352×288), also prepares a motion vector array having the same size, records an indication whether the mode of each macro block is a P block or an I block, in the block mode storage array, and records motion vectors in the motion vector array corresponding to the P block. The decoder 307 forms a block binary image having the same size as the motion vector array, and provides the block binary image to the person detector 309 and the obstacle detector 311.

The person detector 309 regards a block having the motion vector size of nonzero as a block including a person. When the person is moving and when his or her cloths have no pattern and blocks are not discriminated, the person detector 309 regards that motion vectors primarily appear on a boundary of the body of the person but not in the inside of the person.

When there is no proper pattern in one block corresponding to the background or there is a similar pattern around the block with the pattern, the person detector 309 excludes the block because the block leads to a motion vector even though an object is actually stationary. A newly appearing background due to motion of one block must be usually encoded into I blocks. However, when the block has a similar pattern to an adjacent block of a previous frame, the block is encoded into P blocks as well, leading to motion vectors. In these cases, the motion vectors are generally not associated with a motion vector of an adjacent block and a motion vector of an adjacent block of a previous frame. Accordingly, the person detector 309 regards the direction and the size of the motion vector as random.

Figure 6:
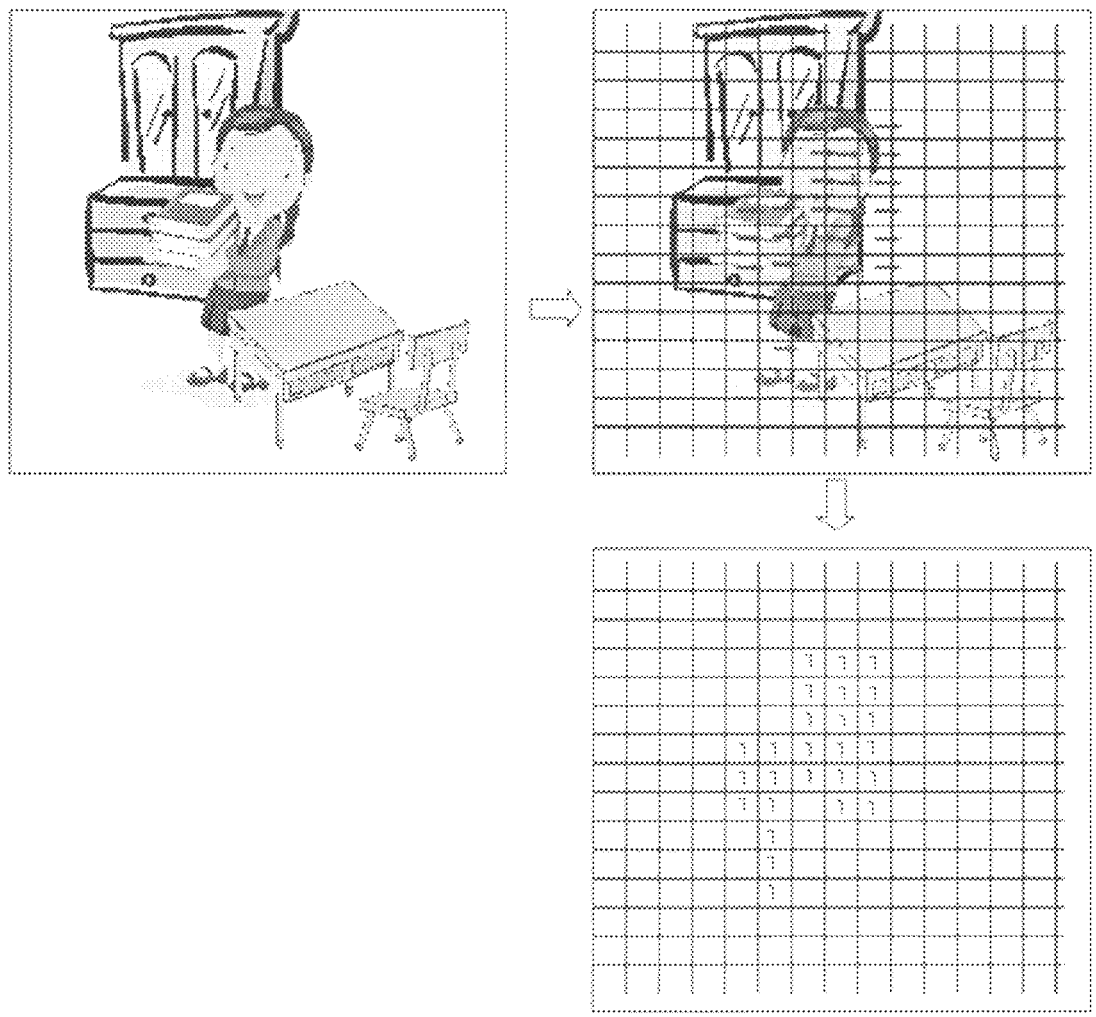
FIG. 6 illustrates processes of encoding, decoding and forming a binary image in accordance with the present invention.

As shown in FIG. 6, the person detector 309 complements a motion vector that should have appeared in the vicinity of correct motion vector macro blocks, and forms a binary image and applies a binary morphology to remove random vector macro blocks. For a macro block having a value of the macro block mode storage array being a P block and a vector size of the motion vector array being greater than 0, the person detector 309 sets a corresponding pixel value of the macro block binary image to a foreground value 1 and regards remaining pixels as a background value 0.

The person detector 309 sequentially applies foreground-value dilation and erosion to the macro block binary image and sets pixels corresponding to the omitted macro block to a foreground value 1. In this process, since I block mode macro blocks may be changed into 1, a pixel value corresponding to the I blocks is returned to 0. The inside of the moving person is filled through this process.

The person detector 309 then detects the person on a block-by-block basis. When the distance to the person is calculated using disparity map blocks corresponding to boundary blocks as the motion vector is primarily generated on a boundary between the person and the background, the boundary blocks must be excluded in consideration of influence from the distance to the background. The blocks including the boundary are then removed by performing additional erosion on the binary image. In this process, some of the random vectors disappear.

Figure 7:
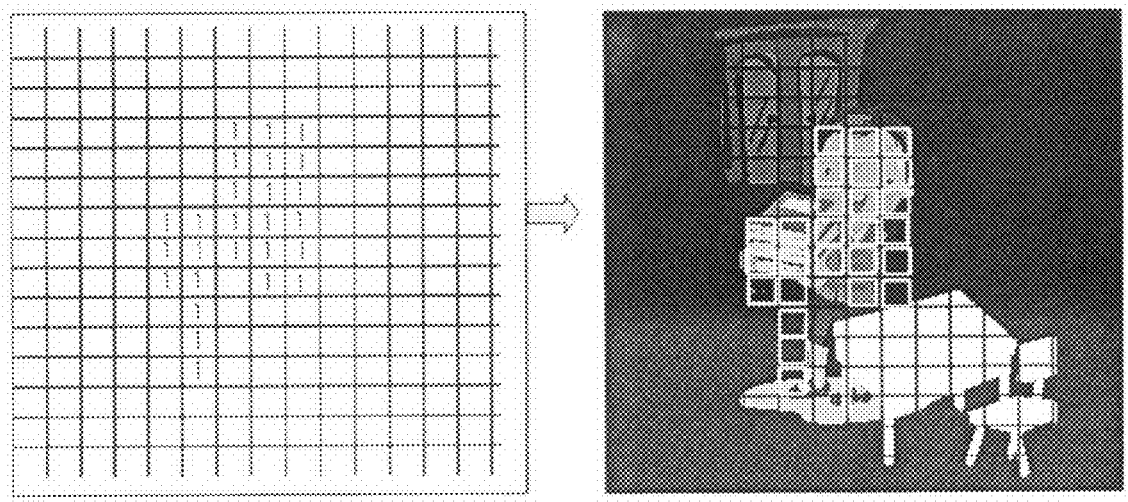
FIG. 7 illustrates a person area detected using a binary morphology and a corresponding disparity block in accordance with the present invention.

As shown in FIG. 7, the person detector 309 labels the binary image to group adjacent pixels into one object, causes left and right boundaries of pixels included in each object to correspond to an angle of view of the camera to obtain an azimuth angle of the object, statistically processes binocular disparity values corresponding to pixels included in each object, regards it as a distance to the moving object, i.e., the person, and provides the person detection result to the obstacle detector 311 (S411).

Figure 8:
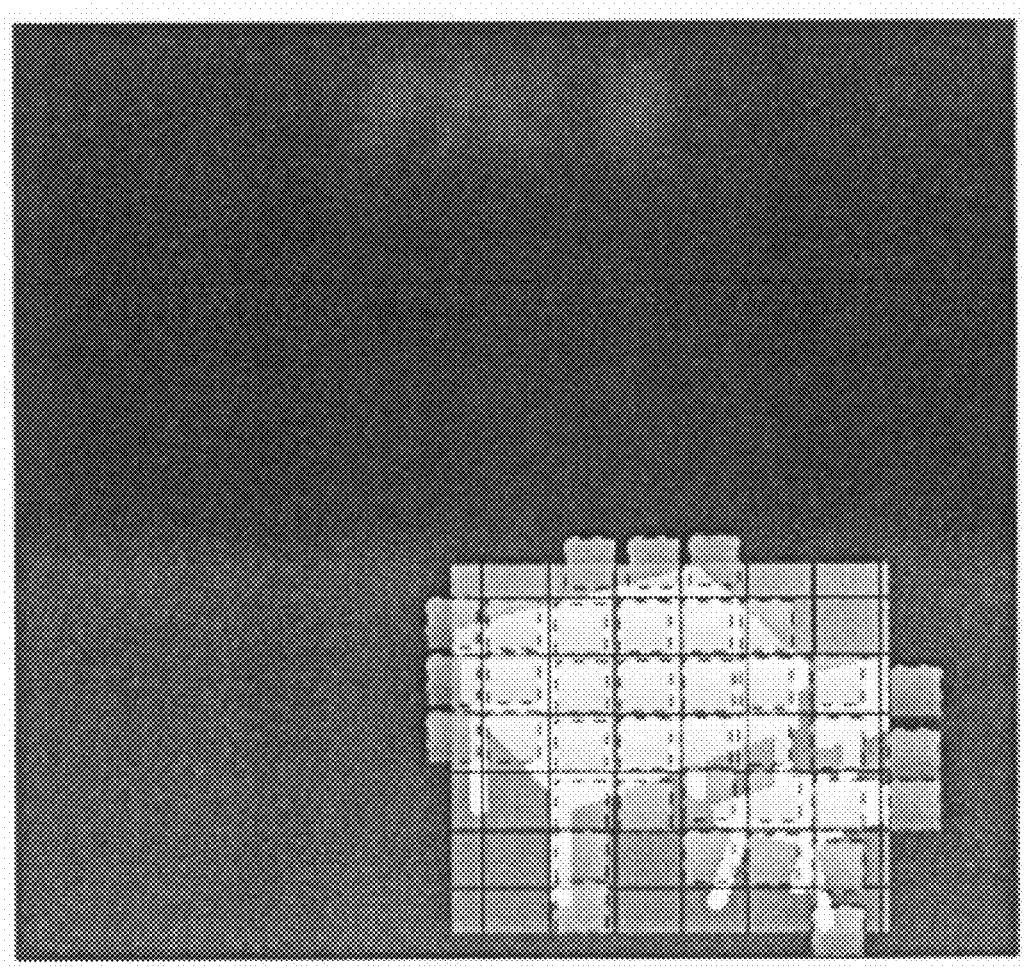
FIG. 8 illustrates a disparity map including only closer blocks than a person in accordance with the present invention.

The obstacle detector 311 regards the shortest distance of the distances to the person detected by the person detector 309 as a threshold of an obstacle detection distance. As shown in FIG. 8, the obstacle detector 311 first excludes blocks having a motion vector and blocks determined to be the person among all the blocks, further excludes blocks included in the dilation process of the person detector 309, further excludes blocks having a greater distance obtained from the binocular disparity representative value than the threshold among the remaining blocks, forms a binary image corresponding to the remaining blocks, and fills intermediate blocks through dilation and erosion.

The obstacle detector 311 excludes excluded blocks in the person detector 309, labels remaining images to group adjacent pixels into one object, statistically processes binocular disparities corresponding to the pixels to obtain a distance to an obstacle, causes left and right pixels of the object to correspond to the angle of view of the camera, regards it as an azimuth angle of the obstacle, and provides the obstacle detection result to the main processor (S413).

Thus, in the movable robot vision system that outputs an original images and a disparity map of the stereo camera in accordance with the present invention, the movable robot uses the video encoder to detect a location of a person and approach a moving person while avoiding obstacles, thereby limiting the motion vector to normally indicate 16 pixels in upper, lower, right and left sides.

In other words, when the view motion speed of movable robot is high to the extent that a motion corresponding to 16 or greater pixels frequently occurs at a speed of 30 frames per second corresponding to a real-time video, or a viewing angle corresponding to one block is very narrow due to the video encoder normally supporting a very high resolution, the image can be reconfigured using the image reconfiguration unit, as in the right of FIG. 5.

In this case, a two-times vertical motion can be detected in an upper image (the horizontal resolution of which is kept unchanged and only the vertical resolution is reduced to the half), and a two-times horizontal and vertical motion can be detected in a left lower image (the horizontal and vertical resolutions of which are reduced to the half). As a four-times horizontal and vertical motion can be detected in a right lower image of FIG. 5 (the horizontal and vertical resolutions of which are reduced to ¼), a very fast view change of the movable robot can be coped with using image reconfiguration unit 303.

While the invention has been shown and described with respect to the preferred embodiments, it will be understood by those skilled in the art that various changes and modifications may be made without departing from the spirit and scope of the invention as defined in the following claims.

What is claimed is:

1. A robot vision system for outputting a disparity map, the system comprising:
 a stereo camera for receiving left and right images and outputting a disparity map between the two images;
 an encoder for encoding either the left image or the right image into a motion compensation-based video bit-stream;
 a decoder for extracting an encoding type of an image block, a motion vector, and a Discrete Cosine Transform (DCT) coefficient from the video bit-stream;

a person detector for detecting and labeling person blocks in the image using the disparity map between the left image and the right image, the block encoding type, and the motion vector, and detecting a distance from the labeled person to the camera;

an obstacle detector for detecting a closer obstacle than the person using the block encoding type, the motion vector, and the DCT coefficient extracted from the video bit-stream, and the disparity map.

2. The system of claim 1, further comprising:

a viewpoint motion detector for detecting a change in the motion vector corresponding to a change in an origin and a direction of the camera caused by a motion of the movable robot or camera pan tilt;

a tracking unit for estimating a location of aan instantaneously stationary person, based on the detected change in the motion vector; and a viewpoint motion pre-processor for performing viewpoint motion amount-based correction by analyzing the detected change in the motion vector, and for, when the change is a pan or tilting, averaging motion vectors in a direction determined by both boundary blocks and the location of the stationary person estimated by the tracking unit, and subtracting an average value from all the motion vectors.

3. The system of claim 2, wherein the viewpoint motion detector obtains a panning direction of the camera from a direction of the motion vector, and obtains a tilt direction of the camera from the direction of the motion vector and a type of blocks at upper and lower ends.

4. The system of claim 3, wherein the panning direction and the tilt direction are used for detecting the change in the motion vector corresponding to the change in the origin and direction of the camera.

5. The system of claim 2, wherein the viewpoint motion detector detects the change in the motion vector corresponding to the change in the origin and the direction of the camera using motion information and camera pan tilt information of the robot input through a variation of the origin and the viewpoint of the camera between a previous image and a current image from a main processor in the movable robot.

6. The system of claim 1, wherein the encoding uses any one of MPEG4, MPEG2, H.264, and H263.

7. The system of claim 1, further comprising an image reconfiguration unit for reconfiguring a range of the motion vector.

8. The system of claim 7, wherein the image reconfiguration unit receives one original image from the stereo camera, magnifies or reduces the image into different images in a predetermined magnification, and reconfigures the resultant image into an image having a resolution for encoding.

9. A detection method in a robot vision system, comprising:

reconfiguring left and right images;

receiving the reconfigured left and right images and encoding the same into a motion compensation-based video bit-stream;

partially decoding the video bit-stream to extract an encoding type of an image block, a motion vector, and a DCT coefficient from the video bit-stream;

detecting and labeling person blocks in the image using a disparity map between the left image and the right image, the block encoding type, and the motion vector, and detecting a distance from the labeled person to a camera; and detecting a closer obstacle than the person using the block encoding type, the motion vector, and the DCT coefficient extracted from the video bit-stream, and the disparity map.

10. The method of claim 9, further comprising estimating a motion vector location of a stationary person;

detecting a change in the motion vector corresponding to a change in an origin and a direction of the camera caused by a motion of the movable robot or camera pan tilt; and performing viewpoint motion amount-based correction by analyzing the detected change in the motion vector, and for, when the change is a rotation, averaging motion vectors in a direction determined by both boundary blocks, and subtracting an average value from all the motion vectors.

11. The method of claim 10, wherein the averaging of motion vectors comprises excluding the estimated motion vector of the stationary person.

12. A detection method in a robot vision system, comprising:

photographing left and right images and calculating a disparity map between left and right images using the two images;

reconfiguring one of the left and right images into an image having a resolution for encoding;

receiving the reconfigured image and encoding the same into a video bit-stream;

decoding to extract an encoding type, a motion vector, and a DCT coefficient of the image from the video bit-stream;

detecting and labeling blocks of a moving person within the image using the disparity map between the left image and the right image, and the motion vector, and detecting a distance from the labeled person to thea camera; and detecting a closer obstacle than the person using the extracted encoding type, motion vector, and DCT coefficient of the image, and the disparity map between the left image and the right image.

13. The method of claim 12, wherein the encoding uses any one of MPEG4, MPEG2, H.264, and H263.

* * * * *